United States Patent [19]
Kobayashi

[11] Patent Number: 5,757,443
[45] Date of Patent: May 26, 1998

[54] TRANSMISSION-TYPE DISPLAY DEVICE WITH A HEAT-DISSIPATING GLASS PLATE EXTERNAL TO AT LEAST ONE LIQUID CRYSTAL SUBSTRATE

[75] Inventor: Mikiya Kobayashi, Kanagawa, Japan

[73] Assignee: Sony Corporation, Tokyo, Japan

[21] Appl. No.: 730,014

[22] Filed: Oct. 11, 1996

[30] Foreign Application Priority Data

Oct. 13, 1995 [JP] Japan ................... 7-291792

[51] Int. Cl.⁶ .................. G02F 1/1335; G02F 1/1333
[52] U.S. Cl. ................ 349/5; 349/122; 349/158; 349/161
[58] Field of Search .................. 349/122, 158, 349/161, 5

[56] References Cited

U.S. PATENT DOCUMENTS

| | | | |
|---|---|---|---|
| 4,690,511 | 9/1987 | Watanabe | 349/158 |
| 4,715,686 | 12/1987 | Iwashita et al. | 349/122 |
| 4,994,672 | 2/1991 | Cross et al. | 250/330 |
| 5,012,274 | 4/1991 | Dolgoff | 340/702 |
| 5,170,194 | 12/1992 | Kurematsu et al. | 349/161 |
| 5,233,459 | 8/1993 | Bozler et al. | 359/230 |
| 5,282,121 | 1/1994 | Bornhorst et al. | 362/294 |

*Primary Examiner*—Anita Pellman Gross
*Attorney, Agent, or Firm*—Hill, Steadman & Simpson

[57] ABSTRACT

A transmission-type display device including: a first transparent substrate having pixel electrodes and switching elements formed thereon, each of the pixel electrodes being connected to the respective switching element; a second transparent substrate having a counter electrode formed thereon and being positioned opposite to the first transparent substrate in such a manner as to leave a gap therebetween; a liquid crystal layer held in the gap between the first transparent substrate and the second transparent substrate; and a heat-dissipating glass plate of a thermal conductivity of 1 W/m·K or more and a thickness of 1 mm or more arranged at the outer surface of at least the first transparent substrate constructed in such a manner that picture quality does not deteriorate even if dust becomes attached to the liquid crystal panel or lens. Instead, the heat-dissipating glass plate can be bonded to the outer surface of the first transparent substrate in such a manner as to leave a gap of width of 2 mm or less between the heat-dissipating glass plate and the first transparent substrate.

16 Claims, 4 Drawing Sheets

TRANSMISSION-TYPE DISPLAY DEVICE WITH A HEAT-DISSIPATING GLASS PLATE EXTERNAL TO AT LEAST ONE LIQUID CRYSTAL SUBSTRATE

BACKGROUND OF THE INVENTION

The present invention relates to a transmission-type display device incorporated in, for example, a projector, and more particularly relates to a liquid-crystal panel cooling structure thereof.

A typical configuration of a liquid-crystal projector is simply described with reference to FIG. 1. The liquid-crystal projector is equipped with a light source 201, with this light source 201 having a lamp such as a metal halide lamp 202 for generating powerful light and a spheroidal reflecting mirror 203. A heat ray cutting filter 204, an incident side polarizing plate 205 and a condensing lens 206 are arranged in front of the light source 201 in that order. A liquid-crystal panel 207, outgoing side polarizing plate 208 and a projecting lens 209 are provided in front of the condensing lens 206. Powerful light projected from the metal halide lamp 202 passes through the heat ray cutting filter 204 and unnecessary infra-red rays are removed. The light with the infra-red rays removed then passes through the incident side polarization plate 205, is condensed by the condensing lens 206 and becomes incident on the liquid-crystal panel 207. Light that has passed through the liquid-crystal panel 207 then passes through the outgoing side polarization plate 208 and is expanded by the projecting lens 209. The image formed at the liquid crystal 207 is then projected onto an image projection surface such as a screen set-up to the front. The configuration shown in FIG. 1 is a so-called single plate type configuration where one liquid-crystal panel equipped with a color filter is used. However, a three-plate configuration where three liquid crystal panels are incorporated corresponding to light sources for the three primary colors red, green and blue are also well known.

The thickness of the liquid crystal panel, about 2 mm, is comparatively thin. As a result, when there are irregularities in the intensity distribution of the light from the light source, so-called hot spots occur because light becomes locally concentrated on the liquid-crystal panel and portions of the liquid crystal panel become heated. The transmittance of these hot spots differs from that of the surrounding portions, the enlarged and projected image becomes uneven and the quality of the appearance of the image therefore deteriorates. Further, radiation heat from the light source raises the temperature of the liquid-crystal panel and this is accompanied by deterioration in the characteristics of the liquid-crystal. As a result of this deterioration, display functions cannot be achieved with liquid crystal panels because liquid crystal panels used with projectors are heated to high temperatures using a powerful light source.

Because of this, a mechanism for cooling the liquid-crystal panel has usually been built into the liquid crystal projector. Air cooling methods and liquid cooling methods have been adopted as cooling methods for this cooling mechanism. However, these cooling methods have the following problems with noise and dust adhesion. Namely, noise becomes severe as a result of a fan rotating at high speed when the amount of air blown is increased to provide a sufficient cooling effect. This is therefore not suitable for the projection of images such as movies to be appreciated within a quiet room. In the case of simple air cooling methods, the cooling efficiency is usually low and strong ventilation is therefore necessary. The fans used as a result are large and are therefore not suitable for personal use such as for home theaters. Further, when ventilation for cooling is carried out, dust is blown up within the projector and becomes attached to the liquid crystal panel and lens. This is then projected with the image and the picture quality of the projected image therefore deteriorates. On the other hand, in a liquid cooling method as is disclosed in, for example, Japanese Patent Publication Hei. 6-58474, a liquid acting as a heat exchanging medium is enclosed within the cooling mechanism. However, various problems regarding reliability occur with regards to the enclosed liquid such as pressure release at the time of temperature rises, the occurrence of bubbles, the foreign particles inclusion and cooling liquid leakage. In particular, rusting of metal parts is a problem with water cooling methods. Large volumes of liquid are necessary for carrying out cooling and the cooling mechanism therefore becomes large. In addition to the above cooling methods, there are also solid state cooling methods using electronic cooling devices incorporating solid-state devices such as Peltier devices. However, in these kinds of methods, the overall cost of the projector increases dramatically and it is difficult to obtain a sufficient cooling effect.

SUMMARY OF THE INVENTION

As the present invention sets out to resolve the problems with the aforementioned technology, it is the object of the present invention to provide a liquid crystal panel cooling structure having the advantages of simple handling, high reliability and low manufacturing costs without picture quality deterioration even if dust becomes attached. In order to achieve this object, the present invention can be constituted in the following ways.

According to the present invention, a transmission-type display device comprises a first transparent substrate, a second transparent substrate, a liquid crystal layer and a heat-dissipating glass plate. The first transparent substrate has pixel electrodes and switching elements formed thereon, each of the pixel electrodes being connected to the respective switching elements. The second transparent substrate has a counter electrode formed thereon and is positioned opposite to the first transparent substrate in such a manner as to leave a gap therebetween. The liquid crystal layer is held in the gap. The heat-dissipating glass plate has a thermal conductivity of 1 W/m·K or more and a thickness of 1 mm or more and is arranged at the outer surface of at least the first transparent substrate.

The heat-dissipating glass plate can be adhered to the outer surface of the first transparent substrate or the heat-dissipating glass plates can be adhered to the outer surfaces of the first and second transparent substrates.

Further, a light-polarizing plate can be arranged at the outer surface of the heat-dissipating glass plate adhered to the outer surface of the first transparent substrate or arranged between the first transparent substrate and the heat-dissipating glass plate.

Moreover, the heat-dissipating glass plate is made of quartz glass or heat-resistant glass.

The heat-dissipating glass plate can be bonded to the outer surface of the first transparent substrate in such a manner as to leave a gap of width 2 mm or less between the heat-dissipating glass plate and the first transparent substrate, or the heat-dissipating glass plates can be bonded to the outer surfaces of the first and second transparent substrates in such a manner as to leave gaps of width 2 mm or less between the heat-dissipating glass plates and the first and second transparent substrates.

The heat-dissipating glass plate can also be provided with antireflection films formed on both sides thereof.

Further, according to the present invention, a liquid-crystal projector comprises a liquid crystal panel and an optical part. The liquid-crystal panel comprises a first transparent substrate having pixel electrodes and switching elements formed thereon, each of the pixel electrodes being connected to the respective switching elements, a second transparent substrate having a counter electrode formed thereon and being positioned opposite to the first transparent substrate in such a manner as to leave a gap therebetween, a liquid crystal layer held in the gap, and a heat-dissipating glass plate of a thermal conductivity of 1 W/m·K or more and a thickness of 1 mm or more arranged at the outer surface of at least the first transparent substrate. The optical part is for providing a light incident on the liquid-crystal panel and for enlarging and projecting the light transmitted from the liquid-crystal panel.

The optical part has a light source for providing the light incident on the liquid-crystal panel and a projecting lens for projecting the light transmitted from the liquid-crystal panel.

The heat-dissipating glass plate can be adhered to the outer surface of the first transparent substrate or the heat-dissipating glass plates can be adhered to the outer surface of the first and second transparent substrates.

Further, the heat-dissipating glass plate can be bonded to the outer surface of at least the first transparent substrate in such a manner as to leave a gap of width 2 mm or less between the heat-dissipating glass plate and the first transparent substrate, or the heat-dissipating glass plates can be bonded to the outer surfaces of the first and the second transparent substrates in such a manner as to leave gaps of width 2 mm or less between the heat-dissipating glass plates and the first and second transparent substrates.

Moreover, the heat-dissipating glass plate can be provided with antireflection films formed on both sides thereof.

DETAILED DESCRIPTION OF THE PREFERRED EMBODIMENTS

First Embodiment

Figure 1:
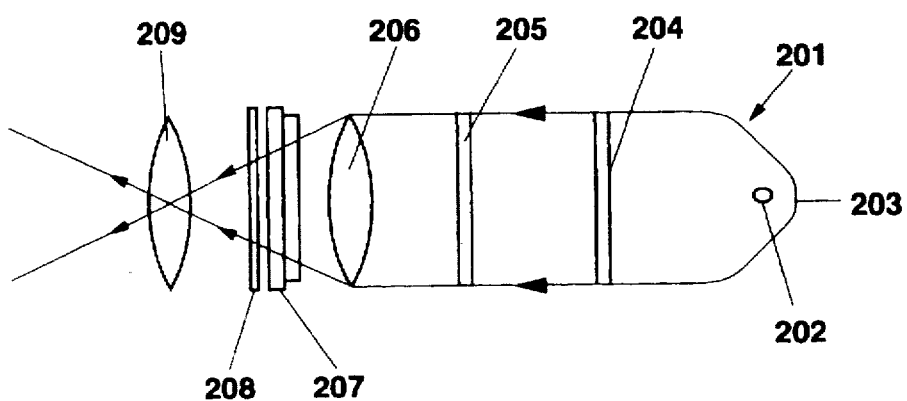
FIG. 1 is a schematic view showing a typical configuration of a liquid crystal projector.
Figure 2A:
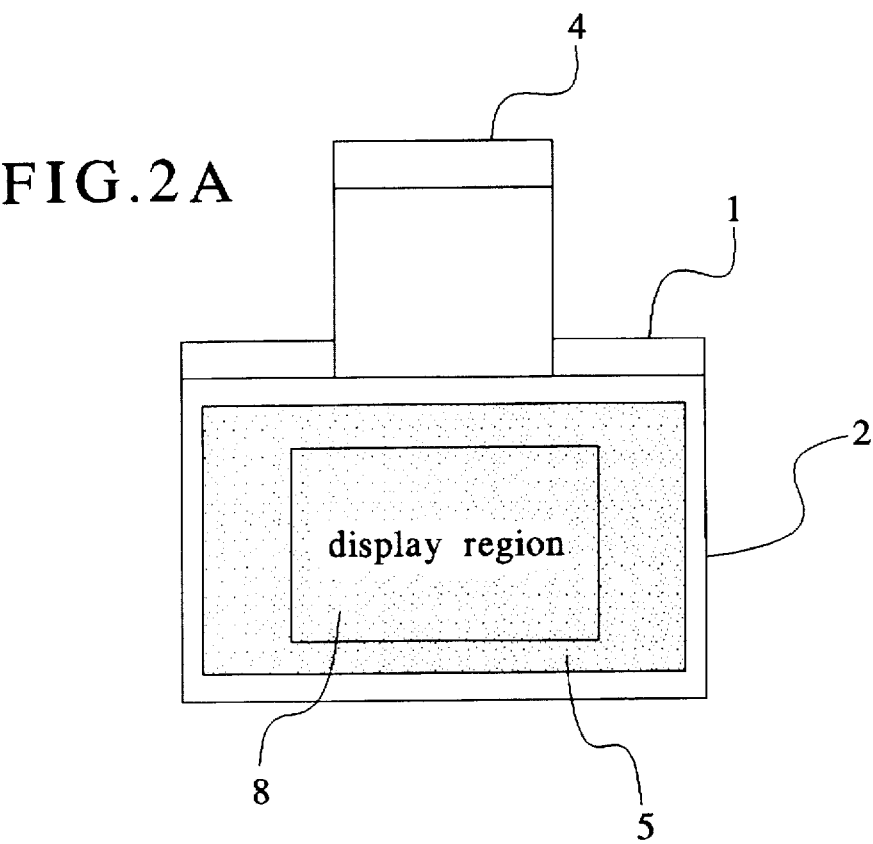
FIG. 2A is a plan view and FIG. 2B is a cross-sectional view showing a first embodiment of the transmission-type display device according to the present invention.
Figure 2B:
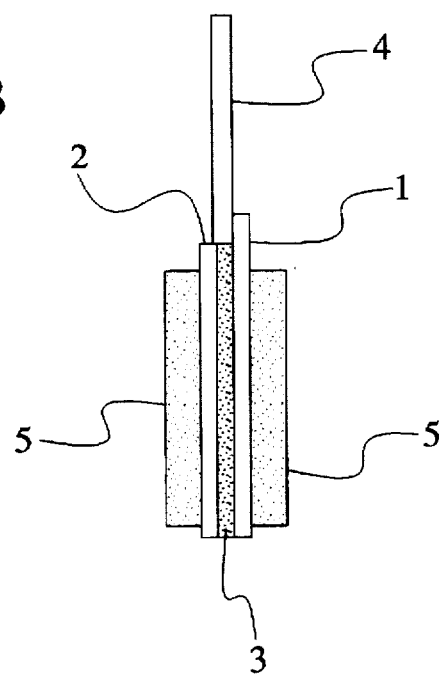

The following is a detailed description of the preferred embodiments with reference to the drawings. FIG. 2A and FIG. 2B show a first embodiment of a transmission-type display device of the present invention. FIG. 2A is a plan view of the transmission-type display device and FIG. 2B is a cross-sectional view of the same. In FIGS. 2A and 2B, the transmission-type display device has a panel structure comprising a transmission substrate (driver substrate) 1 for pixel electrodes and switching devices formed at a display region 8, another transmission substrate (opposing substrate) 2 formed with a counter electrode thereon, and liquid crystal 3 held in the space between the joined substrates 1 and 2, and is used for displaying projected images as in a projector. A flexible connector 4 for external connecting is connected at the end of the upper surface of the driver substrate 1. A polarizing plate is also adhered to the outer surface of the heat-dissipating glass plate 5 adhered to the outer surface of the driver substrate 1 or between the driver substrate 1 and the heat-dissipating glass plate 5. In the present invention, a heat-dissipating glass plate 5 of a thermal conductivity of greater than 1 W/m·K and a thickness of greater than 1 mm is characteristically adhered directly to the outer surface of at least one of the transparent substrates. In this embodiment, heat-dissipating glass plates 5 are adhered to both the driver substrate 1 and the opposing substrate 2. These heat-dissipating glass plates 5 are made of quartz glass or heat-resistant glass. The quartz glass is sufficiently thermally conductive and has a thermal conductivity of about 1.4 W/m·K. The heat-resistant glass, if it is borosilicate glass, has a thermal conductivity of about 1.1 W/m·K and is also well thermal conductive. Contrary to this, with usual soda glass, which only has a thermal conductivity of about 0.5 to 0.7 W/m·K, sufficient cooling effects and heat-dissipation effects cannot be obtained.

As described above, in this embodiment, heat-dissipating glass plates 5 of thickness 1 mm are adhered to the surfaces of the driver substrate 1 and the opposing substrate 2. Heat radiation from the whole of this transmission-type display device can therefore be enhanced with this structure as heat accumulated at the driver substrate 1 and the opposing substrate 2 is diffused and dispersed through the heat dissipating glass plates 5. The plate thickness of the driver substrate 1 and the opposing substrate 2 is about 1 mm, but a distance of 2 mm or more can be maintained from the surface of the liquid crystal 3 to the glass surface by adhering heat-dissipating glass plates 5 of a thickness of 1 mm or more. As a result of this, dust attached to the glass surface is projected in a defocused state at the time of projecting the main image without the main image being influenced, and thus, deterioration of picture quality can be reduced. By using this kind of structure, at the transmission-type display device for projector use, increasing of the temperature of the liquid-crystal panel as a result of being illuminated with light from a powerful lamp can be alleviated, and deterioration of the picture quality due to dust attached to the surface can be also reduced. The heat-dissipating glass plate 5 has dimensions being stipulated to at least cover the display region 8 of the transmission-type display device.

Second Embodiment

Figure 3A:
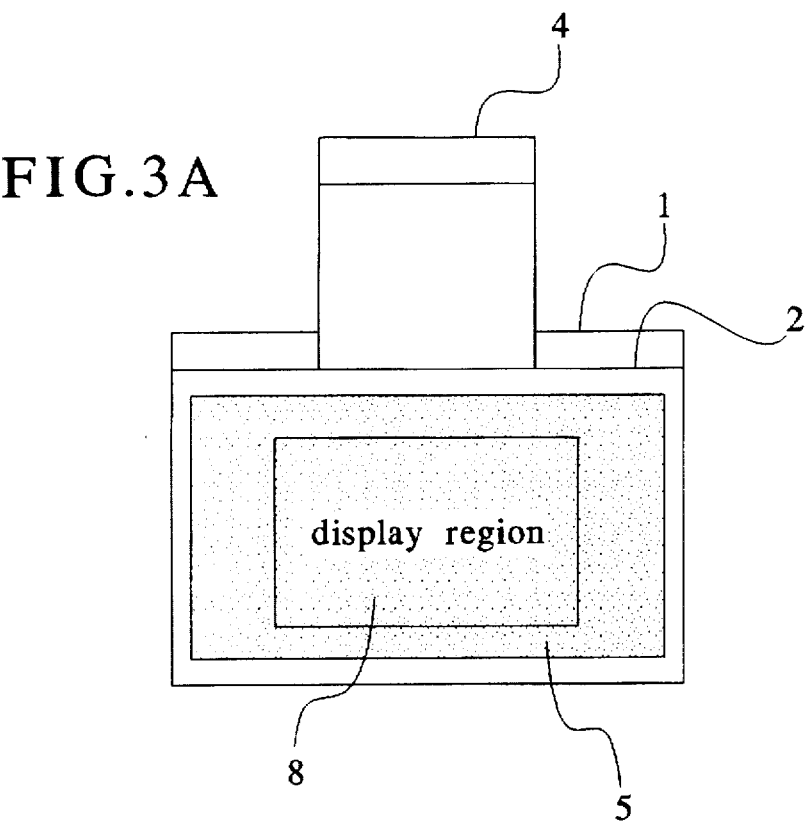
FIG. 3A is a plan view and FIG. 3B is a cross-sectional view of a second embodiment of a transmission-type display device according to the present invention.
Figure 3B:
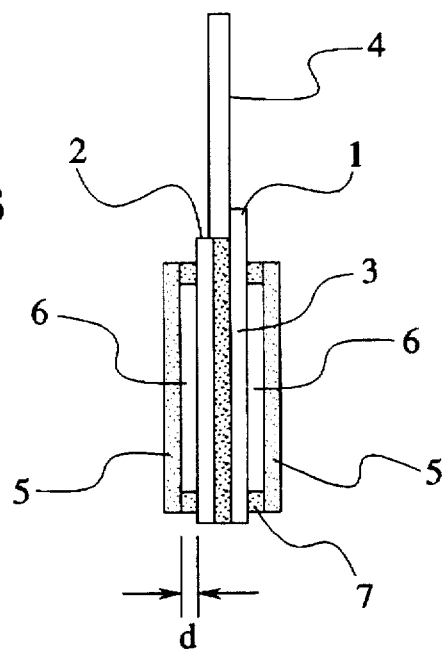

FIG. 3A and FIG. 3B show a second embodiment of the transmission-type display device of the present invention. In the same way as FIG. 2A and FIG. 2B, FIG. 3A shows the shape from the front and FIG. 3B expresses the cross-sectional shape. Basically, the configuration is the same as for the first embodiment shown in FIG. 2A and FIG. 2B, with corresponding portions being given corresponding reference numerals for ease of understanding. The point of difference is that the heat-dissipating glass plates 5 are bonded to the outer surfaces of the driver substrate 1 and the opposing substrate 2 with air-tight gaps 6 of dimensions d of 2 mm or less being remained, i.e. each of the heat-dissipating glass plates 5 are comparatively thin compared with the embodiment shown in FIG. 2, and are bonded to the outer surface of each of the substrates via spacers 7 of the increased thickness by which the glass plates were reduced, with the space between each substrate being air-tight. With this structure, heat is dispersed via an air layer of a thickness of 2 mm or less and a thin heat-dissipating glass plate 5, with it being possible to enhance heat dissipation from the whole of the transmission-type displaying device. A sufficient thermal conductive state cannot be maintained when the dimensions of the air-tight gap 6 exceed 2 mm and a sufficient cooling effect cannot be obtained. Further, because the surface of the heat-dissipating glass plate 5 and the liquid crystal 3 are separated, lowering of the picture quality of the projected image due to dust attached to the surface of the heat-dissipating glass plate can be prevented in the same way as for the first embodiment shown in FIG. 2A and FIG. 2B. Moreover, it is preferable if an antireflection film is formed on both surfaces of the heat-dissipating glass plate 5. As the antireflection film, a multi-layered film can be used in which, for example, $SiO_2$ films of low refractive index and $TiO_2$ films of high refractive index are alternately overlaid. This multilayered film can be formed on both surfaces of the heat-dissipating glass plates 5 by, for example, vacuum evaporation. Loss of incident light due to surface reflections is therefore prevented by thus putting reflection-preventing coatings on both surfaces of the heat-dissipating glass plate 5. Further, the occurrence of erroneous operations of the switching elements such as optical leakage can be prevented which is due to unnecessary light being incident to the liquid-crystal panel as a result of surface reflections.

Figure 4:
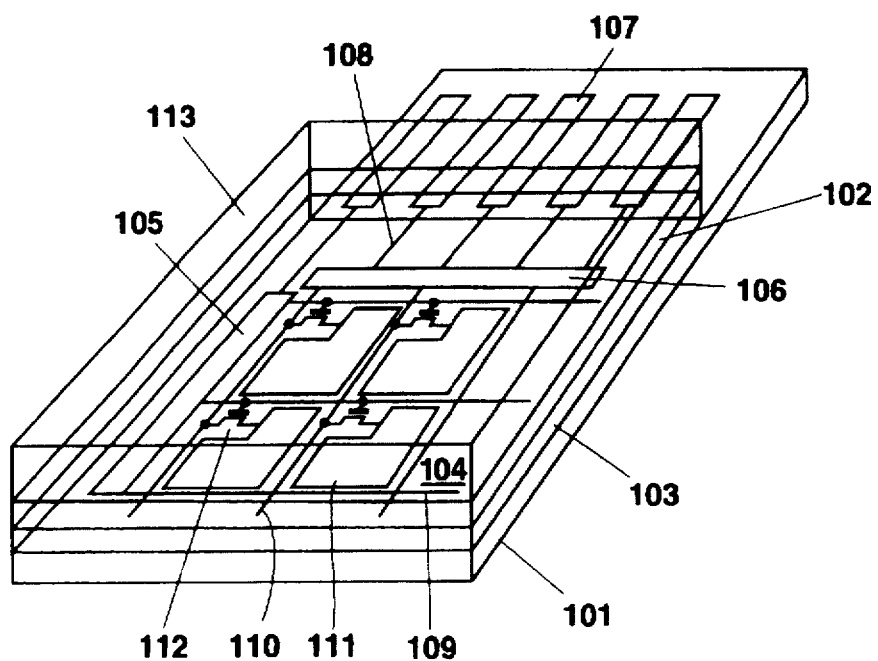
FIG. 4 is a schematic perspective view showing a specific configuration of the transmission-type display device according to the present invention.

Finally, a detailed description is given of a transmission-type liquid-crystal display device with reference to FIG. 4. As shown in FIG. 4, this display device comprises a driver substrate 101 made of a transparent material such as glass, an opposing substrate 102 similarly made of a transparent material such as glass and a liquid-crystal 103 held therebetween. A pixel array (display region) 104 and a driver circuit are integrated at the driver substrate 101. The driver circuit comprises a vertical driving circuit 105 and a horizontal driving circuit 106. Terminals 107 for external connection use are formed in the region of the end of the upper surface of the driver substrate 101. The terminals 107 are connected to the vertical driving circuit 105 and the horizontal driving circuit 106 via wiring 108. The pixel array 104 is equipped with mutually crossing gate lines 109 and signal lines 110. Pixel electrodes 111 and thin-film transistors 112 formed as switching elements for driving the pixels via the pixel electrodes 111 are formed at the points where the lines 109 and 110 cross-over. A counter electrode and, depending on the case, color filters are then formed at the inner surface of the opposing substrate 102, although they are not shown in the drawings.

A characteristic of the present invention is that, for example, heat-dissipating glass plates 113 are bonded to the outer surface of the opposing substrate 102 to absorb heat accumulated at the liquid crystal 103. The driver substrate 101 has a thickness of, for example, about 0.8 mm and the opposing substrate has a thickness of, for example, about 1.1 mm, giving the liquid crystal panel a total thickness of about 2 mm in all. Heat dissipating glass plates 113 each having a thickness of, for example, about 2 mm are adhered to both sides of the liquid-crystal panel and heat accumulated at the liquid crystal panel can be effectively removed. When the liquid crystal panel is incorporated into a projector, the liquid crystal panel is illuminated by a light from a powerful light source. The temperature of the liquid crystal 103 therefore rises to, for example, about 100° C. if only simple cooling is used. If this is left without any measure, there are cases where the temperature of the liquid crystal 103 exceeds the liquefaction temperature, with display functions being damaged in these cases. The heat-dissipating glass plate 113 is therefore integrally attached to the liquid crystal panel so that the desired cooling can be carried out. Thus, a cooling effect with a temperate drop of 100° C. to 200° C. can be achieved.

As described above, according to the present invention, a heat-dissipating glass plate of a thermal conductivity of 1 W/m·K or more and thickness of 1 mm or more is adhered to the outer surface of at least one of the surfaces of the transparent substrates. Alternatively, a heat-dissipating glass plate of thermal conductivity of 1 W/m·K or more is bonded to the outer surface of at least one of the transparent substrates in such a manner as to leave an airtight gap of 2 mm or less. With a transmission-type display device for projection use of this kind of construction, dissipation of heat can be carried out via a highly thermally conductive glass plate from the surface of a panel with the largest surface area. This means that highly reliable cooling is possible with a compact cooling structure when compared with other cooling methods such as liquid cooling methods. Further, deterioration in picture quality of images due to foreign materials such as attached dust can also be abated by maintaining the distance from the liquid crystal surface to the glass surface at 2 mm or more.

What is claimed is:

1. A transmission-type display device comprising:
   a first transparent substrate having pixel electrodes and switching elements formed thereon, each of said pixel electrodes being connected to the respective switching element;
   a second transparent substrate having a counter electrode formed thereon and being positioned opposite to said first transparent substrate in such a manner as to leave a gap therebetween;
   a liquid crystal layer held in said gap; and
   a heat-dissipating glass plate of a thermal conductivity of 1 W/m·K or more and a thickness of 1 mm or more arranged at the outer surface of at least said first transparent substrate.

2. A transmission-type display device according to claim 1, wherein there is only one heat-dissipating glass plate, and said heat-dissipating glass plate is adhered to the outer surface of said first transparent substrate.

3. A transmission-type display device according to claim 1, wherein there are two heat-dissipating glass plates, and said heat-dissipating glass plates are adhered to the outer surfaces of said first and second transparent substrates respectively.

4. A transmission-type displaying device according to claim 3, wherein a light-polarizing plate is arranged at the outer surface of said heat-dissipating glass plate adhered to the outer surface of said first transparent substrate.

5. A transmission-type displaying device according to claim 3, wherein a light-polarizing plate is arranged between said first transparent substrate and said heat-dissipating glass plate adhered to the outer surface of said first transparent substrate.

6. A transmission-type display device according to claim 1, wherein each said heat-dissipating glass plate is comprised of either quartz glass or heat-resistant glass.

7. A transmission-type display device according to claim 1, wherein there is only one heat-dissipating glass plate, and said heat-dissipating glass plate is bonded to the outer surface of said first transparent substrate in such a manner as to leave a gap of width 2 mm or less between said heat-dissipating glass plate and said first transparent substrate.

8. A transmission-type display device according to claim 7, wherein said heat-dissipating glass plate has an antireflection film formed on each side thereof.

9. A transmission-type display device according to claim 1, wherein there are two heat-dissipating glass plates, and said heat-dissipating glass plates are bonded to the outer surfaces of said first and second transparent substrates in such a manner as to leave gaps of width 2 mm or less between said heat-dissipating glass plates and said first and second transparent substrates respectively.

10. A liquid-crystal projector comprising:

a liquid-crystal panel comprising a first transparent substrate having pixel electrodes and switching elements formed thereon, each of said pixel electrodes being connected to the respective switching element, a second transparent substrate having a counter electrode formed thereon and being positioned opposite to said first transparent substrate in such a manner as to leave a gap therebetween, a liquid crystal layer held in said gap, and a heat-dissipating glass plate of a thermal conductivity of 1 W/m·K or more and a thickness of 1 mm or more arranged at the outer surface of at least said first transparent substrate; and optical means for providing a light incident on said liquid-crystal panel and for enlarging and projecting light transmitted from said liquid-crystal panel.

11. A liquid-crystal projector according to claim 10, wherein said optical means has a light source for providing said light incident on said liquid-crystal panel and a projecting lens for projecting said light transmitted from said liquid-crystal panel.

12. A liquid-crystal projector according to claim 10, wherein there is only one heat-dissipating glass plate, and said heat-dissipating glass plate is adhered to the outer surface of said first transparent substrate.

13. A liquid-crystal projector according to claim 10, wherein there is only one heat-dissipating glass plate, and said heat-dissipating glass plates are adhered to the outer surface of said first and second transparent substrates respectively.

14. A liquid-crystal projector according to claim 10, wherein there is only one heat-dissipating glass plate, and said heat-dissipating glass plate is bonded to the outer surface of at least said first transparent substrate in such a manner as to leave a gap of width 2 mm or less between said heat-dissipating glass plate and said first transparent substrate.

15. A liquid-crystal projector according to claim 10, wherein there are two heat-dissipating glass plates, and said heat-dissipating glass plates are bonded to the outer surfaces of said first and second transparent substrates in such a manner as to leave gaps of width 2 mm or less between said heat-dissipating glass plates and said first and second transparent substrates respectively.

16. A liquid-crystal projector according to claim 15, wherein each of said heat-dissipating glass plates has an antireflection film formed on each side thereof.

* * * * *